(12) United States Patent
Bostick et al.

(10) Patent No.: US 10,248,248 B2
(45) Date of Patent: Apr. 2, 2019

(54) USER INTERFACE SELECTION THROUGH INTERCEPT POINTS

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 15/343,771

(22) Filed: Nov. 4, 2016

(65) Prior Publication Data

US 2018/0129334 A1 May 10, 2018

(51) Int. Cl.
*G06F 3/041* (2006.01)
*G06F 3/0481* (2013.01)
*G06F 3/0482* (2013.01)
*G06F 3/0488* (2013.01)
*G06F 3/0484* (2013.01)

(52) U.S. Cl.
CPC .......... *G06F 3/0416* (2013.01); *G06F 3/0482* (2013.01); *G06F 3/0488* (2013.01); *G06F 3/04817* (2013.01); *G06F 3/04842* (2013.01); *G06F 2203/04104* (2013.01); *G06F 2203/04808* (2013.01)

(58) Field of Classification Search
CPC .. G06F 3/0416; G06F 3/04817; G06F 3/0482; G06F 3/0488; G06F 2203/04104
See application file for complete search history.

(56) References Cited

U.S. PATENT DOCUMENTS

| 7,506,269 | B2 | 3/2009 | Lang | |
|---|---|---|---|---|
| 7,778,118 | B2 * | 8/2010 | Lyons | G04G 21/04 368/69 |
| 8,314,775 | B2 * | 11/2012 | Westerman | G06F 3/0235 345/173 |
| 8,384,675 | B2 * | 2/2013 | Westerman | G06F 3/0235 345/173 |

(Continued)

FOREIGN PATENT DOCUMENTS

CN          203902443 U    10/2014

*Primary Examiner* — Vijay Shankar
(74) *Attorney, Agent, or Firm* — Jay Wahlquist; Madeline F. Schiesser; Keohane & D'Alessandro PLLC

(57) ABSTRACT

Approaches presented herein provide for user interface selection through an intercept point defined by a touch sensitive bezel. More specifically, a touch sensitive bezel, in a device having a display at least partially surrounded by the touch sensitive bezel, senses a horizontal position and a vertical position on the display from two locations on the bezel touched by a user. An intersection on the display where the horizontal position and the vertical position cross is determined and can be marked on the display. A user may slide his/her fingers along the touch sensitive bezel to move the intersection around the display. A user may perform an additional action to confirm a selection of an item located at the intersection. The touch sensitive bezel can also be used to control interface selection on a display of a second device by mapping the horizontal and vertical positions to the second device display.

20 Claims, 6 Drawing Sheets

(56) References Cited

U.S. PATENT DOCUMENTS

| | | | |
|---|---|---|---|
| 8,467,270 B2* | 6/2013 | Gossweiler, III | G04G 17/06 345/173 |
| 8,479,122 B2* | 7/2013 | Hotelling | G06F 3/0418 715/767 |
| 9,223,487 B2 | 12/2015 | Maeda | |
| 2009/0059730 A1 | 3/2009 | Lyons et al. | |
| 2013/0107674 A1 | 5/2013 | Gossweiler, III et al. | |
| 2013/0257768 A1 | 10/2013 | Lee et al. | |
| 2014/0055367 A1 | 2/2014 | Dearman et al. | |
| 2015/0109219 A1 | 4/2015 | Heo | |
| 2015/0227166 A1 | 8/2015 | Lee et al. | |
| 2015/0286391 A1* | 10/2015 | Jacobs | G06F 1/163 715/771 |
| 2016/0124633 A1 | 5/2016 | Kim et al. | |

* cited by examiner

USER INTERFACE SELECTION THROUGH INTERCEPT POINTS

TECHNICAL FIELD

This invention relates generally to mobile device user interfaces and, more specifically, to interacting with a mobile device user interface through intercept points defined by a touch sensitive bezel.

BACKGROUND

Touch sensitive user interfaces (UIs) are found on many mobile devices, such as smart phones, tablet computers, personal digital assistants (PDAs), and e-book readers. A touch sensitive area of a mobile device may include a device screen (i.e., a touch screen) or a separate unit, such as a home key, that a user can swipe, press, tap, and/or touch to interact with the mobile device. Generally, a touch sensitive UI responds to the touch of a finger or a similar device, such as a stylus, by transmitting coordinates of the touched area on the UI to a processor of the mobile device. A touch sensitive UI can enable users to interact directly with information displayed on a mobile device, without the assistance of intermediate user input devices, such as a mouse or keyboard.

SUMMARY

In general, embodiments described herein provide for user interface selection through an intercept point defined by a touch sensitive bezel. More specifically, a touch sensitive bezel, in a device having a display at least partially surrounded by the touch sensitive bezel, senses a horizontal position and a vertical position on the display from two locations on the bezel touched by a user. An intersection on the display where the horizontal position and the vertical position cross is determined and can be marked on the display. A user may slide his/her fingers along the touch sensitive bezel to move the intersection around the display. A user may perform an additional action to confirm a selection of an item located at the intersection. The touch sensitive bezel can also be used to control interface selection on a display of a second device by mapping the horizontal and vertical positions to the second device display.

One aspect of the present invention includes a computer-implemented method for user interface (UI) selection through an intercept point defined by a touch sensitive bezel, the computer-implemented method comprising: providing a display having a touch sensitive bezel at least partially surrounding the display; sensing a horizontal position on the display from a first touch of the bezel and a vertical position on the display from a second touch of the bezel; determining an intersection on the display of the horizontal position and the vertical position; sensing a confirming action by a user; and registering a selection of an item at the intersection on the display in response to sensing the confirming action.

Another aspect of the present invention includes a computer system for user interface (UI) selection through an intercept point defined by a touch sensitive bezel, the computer system comprising: a display; a touch sensitive bezel at least partially surrounding the display; a memory medium comprising program instructions; a bus coupled to the memory medium; and a processor, for executing the program instructions, coupled to a bezel sensor tool via the bus that when executing the program instructions causes the system to: sense a horizontal position on the display from a first touch of the bezel and a vertical position on the display from a second touch of the bezel; determine an intersection on the display of the horizontal position and the vertical position; sense a confirming action by a user; and register a selection of an item at the intersection on the display in response to sensing the confirming action.

Yet another aspect of the present invention includes a computer program product for user interface (UI) selection through an intercept point defined by a touch sensitive bezel, the computer program product comprising a computer readable storage device, and program instructions stored on the computer readable storage device, to: sense a horizontal position on a display, the display having a touch sensitive bezel at least partially surrounding the display, from a first touch of the bezel and a vertical position on the display from a second touch of the bezel; determine an intersection on the display of the horizontal position and the vertical position; sense a confirming action by a user; and register a selection of an item at the intersection on the display in response to sensing the confirming action.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
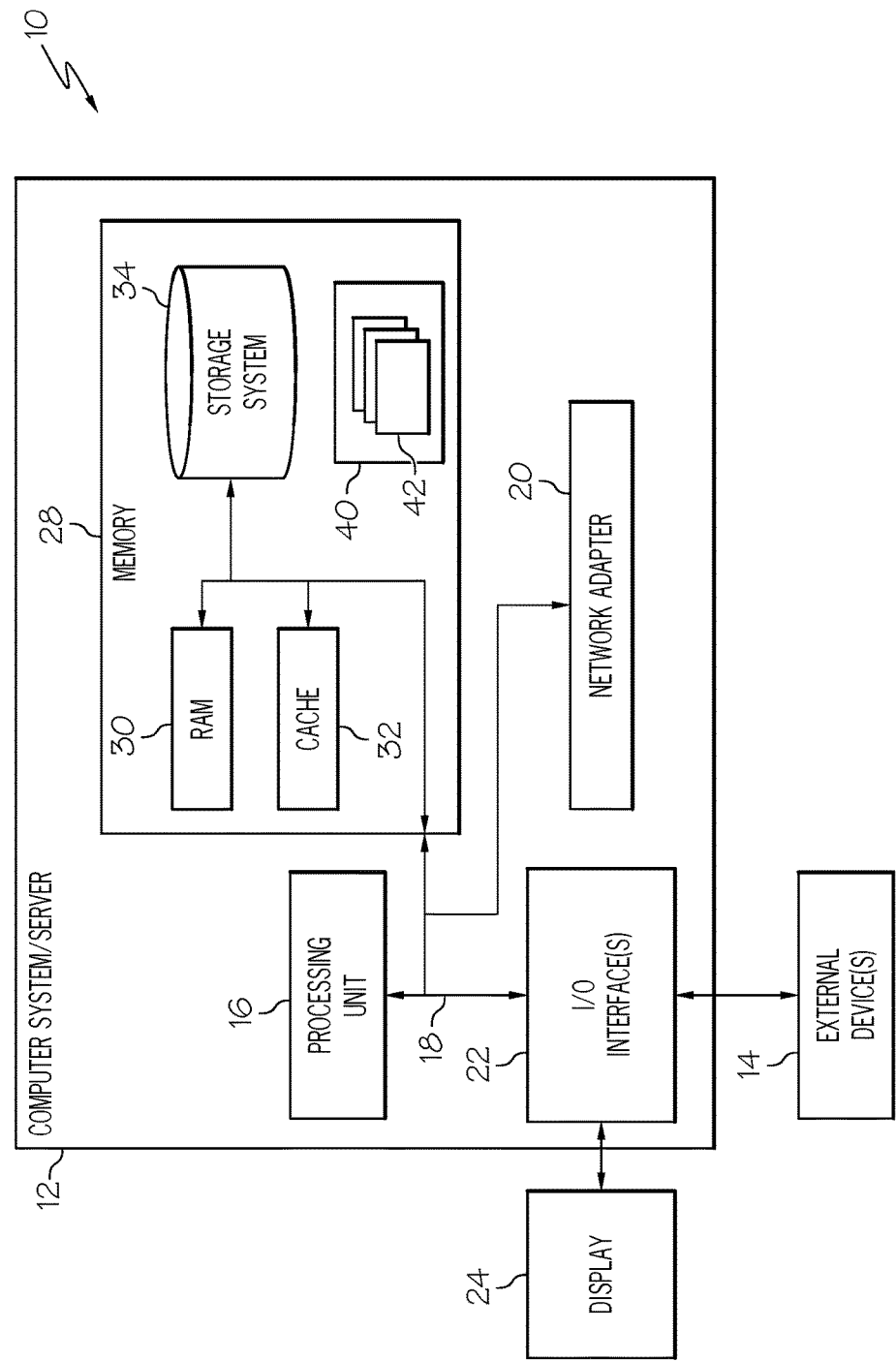
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for user interface selection through an intercept point defined by a touch sensitive bezel. More specifically, a touch sensitive bezel, in a device having a display at least partially surrounded by the touch sensitive bezel, senses a horizontal position and a vertical position on the display from two locations on the bezel touched by a user. An intersection on the display where the horizontal position and the vertical position cross is determined and can be marked on the display. A user may slide his/her fingers along the touch sensitive bezel to move the intersection around the display. A user may perform an additional action to confirm a selection of an item located at the intersection. The touch sensitive bezel can also be used to control interface selection on a display of a second device by mapping the horizontal and vertical positions to the second device display.

Referring now to FIG. 1, a computerized implementation 10 of an embodiment for user interface selection through intercept points defined by a touch sensitive bezel will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for user interface selection through intercept points defined by a touch sensitive bezel. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for user interface selection through intercept points defined by a touch sensitive bezel, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that small touch-screen personal mobile devices, particularly wearables such as smart watches, present user interface challenges due to the small screen size as compared with larger mobile devices such as smart phones and tablets. Specifically, there are two significant challenges associated with controlling and selecting objects on small device screens. Firstly, touching a small screen with a finger conceals a significant portion of the screen from view. Secondly, making fine grained selections on a small screen requires a high degree of accuracy. With such small touch-screen devices, users may find it difficult to make selections and often may accidently select an incorrect item due to factors such as poor visibility or lack of dexterity.

The inventors of the present invention have discovered a system and method for making a user interface selection on a small-screened device (e.g., a smart watch) through a horizontal and a vertical selection point on a touch sensitive and/or pressure sensitive bezel that defines an intercept coordinate on the screen. By applying two fingers to two sides of the bezel, a user can control a set of crosshairs to select user interface items more precisely than existing methods allow, and without obscuring the view of the smart watch. Embodiments of the present invention offer several advantages, including, but not limited to, ensuring that a screen of a small-screened device (e.g., a smart watch) is not obscured by a user's fingers and allowing precise selection of items on a small-screened device. Further embodiments of the present invention offer using the touch sensitive bezel of the small-screened device to remotely and proportionally select items in a user interface of another device paired with the small-screened device.

Figure 2:
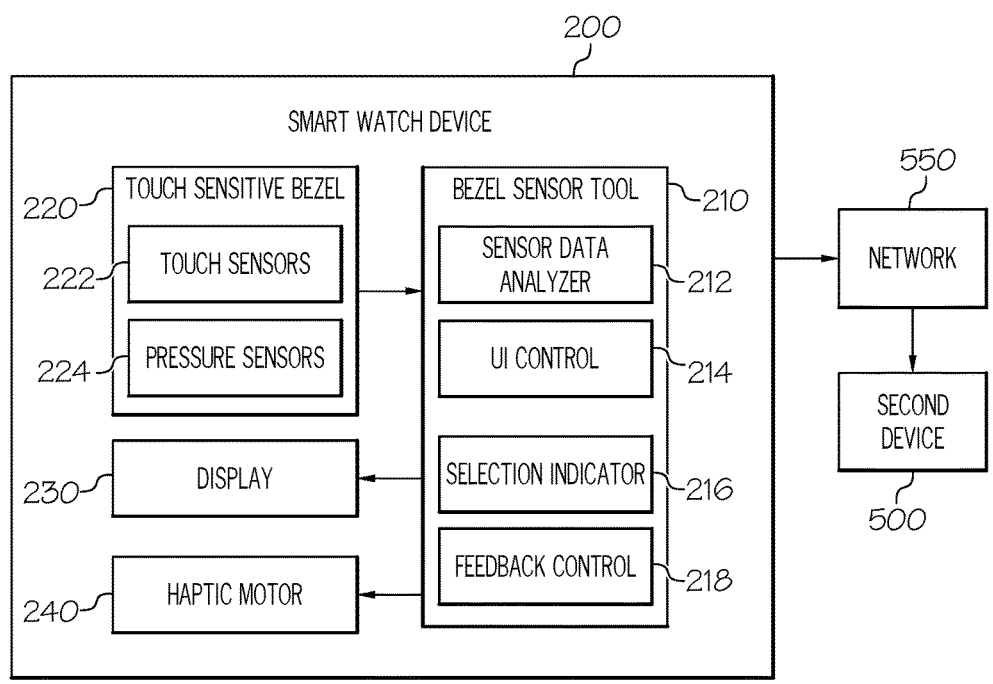
FIG. 2 shows a more detailed system architecture for a device enabling user interface selection through a touch sensitive bezel for defining intercept coordinates according to illustrative embodiments.

Referring now to FIG. 2, a more detailed system architecture for a device enabling user interface selection through a touch sensitive bezel for defining intercept coordinates according to illustrative embodiments is shown. Computer system/server 12 (FIG. 1) can be a small-screened device, such as smart watch device 200, having bezel sensor tool 210 containing program instructions for carrying out embodiments of the present invention, namely detecting a location of two touches on a bezel of smart watch device 200 and drawing a vertical and horizontal representation of those touch points on a display screen of smart watch device 200 to show an intercept point location. It should be understood that, although a smart watch device is presented in illustrative embodiments of the present invention, in some embodiments, computer system/server 12 can be any other type of small-screened device including a mobile phone, a pair of smart glasses, or any other small-screened mobile device now known or later developed. In some embodiments, bezel sensor tool 210 can be program/utility 40 of FIG. 1. Bezel sensor tool 210 can contain a set of components for carrying out embodiments of the present invention, including sensor data analyzer 212, user interface (UI) control 214, selection indicator 216, and feedback control 218. Bezel sensor tool 210 of smart watch device 200 can further be in communication with a second device 500 through network 550 via a communications component (not shown) of smart watch device 200.

Smart watch device 200 can further contain, and bezel sensor tool 210 can be in communication with, touch sensitive bezel 220, containing an array of sensors including touch sensors 222 and/or pressure/push sensors 224. Touch sensitive bezel 220 can be, in some embodiments, a touch sensitive bezel at least partially surrounding (e.g., as a perimeter) display 230 of smart watch device 200. In some embodiments, touch sensitive bezel 220 can be a rim which at least partially encompasses and, in some embodiments, may fasten, a display screen (e.g., a glass touch screen) to an electronic device, such as a smart watch. In one example, this rim can have a thickness of about 1-2 mm on each side of a display screen. In other embodiments, touch sensitive bezel 220 can be a casing having a depth (e.g., about 10 mm) for holding electrical components of smart watch device 200 in addition to at least partially surrounding display 230 of smart watch device 200. In still other embodiments, touch sensitive bezel 220 can be a dedicated area on a bezel rim or case that is configured to accept touch commands. In yet another embodiment, touch sensitive bezel 220 can be a touch sensitive area of display 230 (e.g., a 1-5 mm thick perimeter of a display screen or smart watch face), the dimensions of which can be defined and designated by a software process. Although several examples of bezels are offered above, it should be understood that touch sensitive bezel 220 is not limited to the above examples, and can include any structure that at least partially surrounds or acts as a perimeter to a display screen on an electronic device.

As stated above, touch sensitive bezel 220 can contain an array of sensors including touch sensors 222 and/or pressure/push sensors 224. Touch sensors 222 of touch sensitive bezel 220 can detect the presence and location of one or more user fingers on the touch sensitive bezel, providing coordinates for a point along the bezel where smart watch device 200 is touched. Touch sensors 222 can include any type of touch sensor technology now known or later developed, including, but not limited to resistive touch, surface acoustic wave (SAW), capacitance, infrared grid, infrared acrylic projection, optical imaging, dispersive signal, and acoustic pulse recognition. In some embodiments, touch sensitive bezel 220 can detect at second level of pressure with pressure/push sensors 224 that can detect a harder touch (e.g., a press or squeeze) to the bezel. Pressure/push sensors 224 can also include any type of touch or pressure sensor technology now known or later discovered, including those listed above.

Smart watch device 200 can further contain, and bezel sensor tool 210 can be in communication with, display 230 and haptic motor 240. Display 230 can be any type of display screen now known or later developed for use in a personal mobile device, including, for example, a touch screen. Also, in some embodiments, display 230 need not be a touch screen; rather, a user may interact with smart watch device 200 simply through touch sensitive bezel 220. In some embodiments, haptic motor 240 can be used to generate a vibration in smart watch device 200 to indicate a response to a user interaction with touch sensitive bezel 220.

Figure 3:
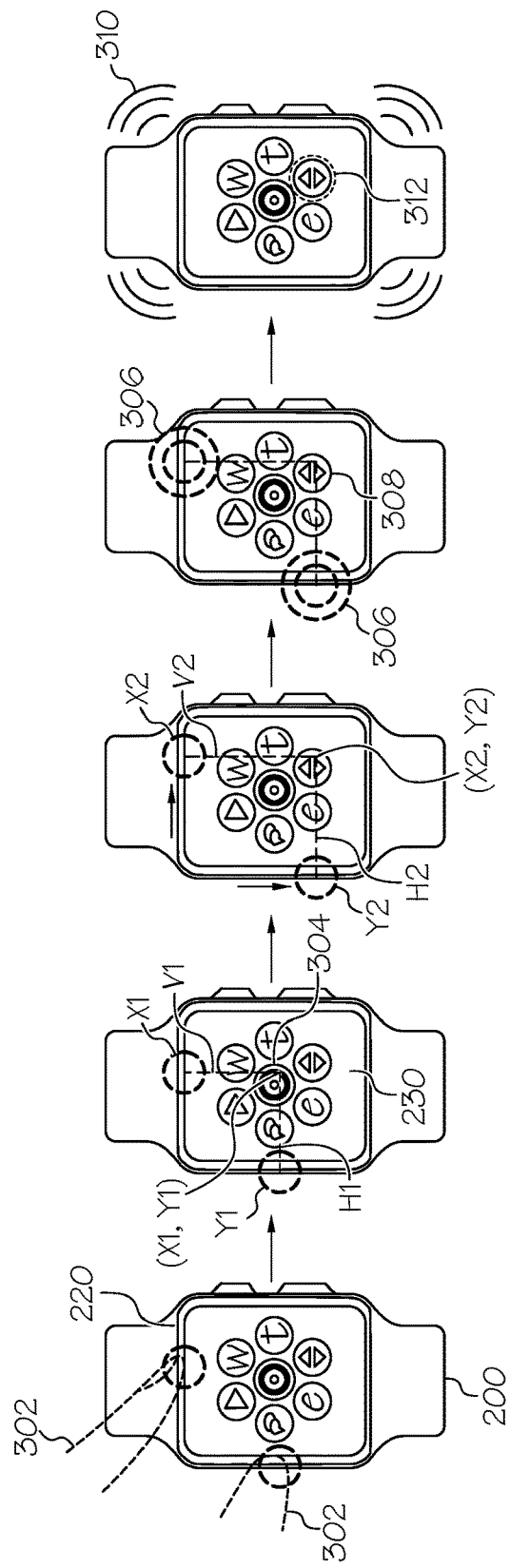
FIG. 3 shows an illustrative example of using a touch sensitive bezel to select an item from a display of a device through horizontal and vertical selection points on a touch sensitive bezel according to illustrative embodiments.

Referring now to FIG. 3 in connection with FIG. 2, an illustrative example of using touch sensitive bezel 220 to select an item or object (e.g., an icon) from display 230 (e.g., a home screen) of smart watch device 200 through horizontal and vertical selection points on touch sensitive bezel 220 is shown. In this illustrative example, smart watch device 200 and displayed content thereon are oriented, as shown in FIG. 3, from a perspective of a user viewing smart watch device 200 that he/she is wearing. Accordingly, left and right sides of display 230 are oriented vertically and top and bottom sides of display 230 are oriented horizontally.

To select an item from display 230 using touch sensitive bezel 220, a user may place one or more fingers 302 (e.g., a forefinger and thumb) on touch sensitive bezel 220. For example, the user may place his/her forefinger on a substantially horizontal side (e.g. top side) of touch sensitive bezel 220 to select a horizontal position and his/her thumb on a substantially vertical side (e.g., right side) of touch sensitive bezel 220 to select a vertical position. Touch sensors 222 of touch sensitive bezel 220 detect this contact and relay the sensed contact data to bezel sensor tool 210 (FIG. 2).

At bezel sensor tool 210, sensor data analyzer 212 divides touch sensitive bezel 220 into segments, some of which represent a horizontal x-axis of display 230 and some of which represent a vertical y-axis of display 230. In the case of a square or rectangular smart watch device 200 and touch sensitive bezel 220, sensor data analyzer 212 designates a right and left side of touch sensitive bezel 220 as corresponding to the horizontal x-axis and designates a top and bottom side of touch sensitive bezel 220 as corresponding to the vertical y-axis. Sensor data analyzer 212 interprets the sensed contact data to determine horizontal location X1 on the horizontal x-axis and vertical location Y1 on the vertical y-axis that the user touched on touch sensitive bezel 220. Sensor data analyzer 212 correlates these locations to intercept point 304 at coordinates (X1, Y1) on display 230 of smart watch device 200 or, in other words, where a vertical line V1 from horizontal location X1 and a horizontal line H1 from vertical location Y1 would intercept in a Cartesian coordinates system. In some embodiments, UI control 214 can draw vertical line V1 and horizontal line H1 on display 230 to permit the user to view intercept point 304 on display 230 corresponding with the locations on touch sensitive bezel 220 that the user is touching. In some embodiments, vertical line V1 and horizontal line H1, as drawn by UI control 214, stop at their intercept, as shown in FIG. 3, or continue across display 230, forming a crosshair.

The user may then move (e.g., slide) fingers 302 along touch sensitive bezel 220 to move intercept point 304 around display 230 and to align intercept point 304 with an intended selection (e.g., an icon) on display 230. For example, the user can adjust intercept point 304 by moving his/her thumb and forefinger to a new position on touch sensitive bezel 220. As the user moves his/her fingers, touch sensors 222 detect the place of the moved contact and touch sensitive bezel 220 relays this contact information to sensor data analyzer 212 of bezel sensor tool 210 (FIG. 2). Sensor data analyzer 212, as previously described, interprets this new/updated contact data to determine a second horizontal location X2 and second vertical location Y2 that the user is touching on touch sensitive bezel 220 and correlates these locations to an updated intercept point 304 at coordinates (X2, Y2) on display 230, or, in other words, where vertical line V2 from horizontal location X2 and a horizontal line H2 from vertical location Y2 intercept. Again, as previously described, UI control 214 can draw (e.g., move with animation) vertical line V2 and horizontal line H2 to permit the user to view updated intercept point at (X2, Y2) on display 230. In another embodiment, an object, such as an icon on the screen may be emphasized in response to intercept point being on a point of display 230 occupied by the object.

A user may perform additional action 306 to confirm that a placement of intercept point 304 is aligned with and indicates an item/object 308 (e.g., an icon) the user wants to select. In some embodiments, this confirming action 306 can include, but is not limited to, a second touch (e.g., a press having a second or greater touch intensity), a maintaining of fingers 302 at the coordinates of intersection 304 for a period of time (e.g., holding a thumb and forefinger still at positions X2 and Y2 until a time threshold is reached), or a swipe by one or more fingers 302 in the direction of intersection 304 (e.g., pinching a thumb and forefinger at positions X2 and Y2 towards intersection 304). For example, in one embodiment, a user may apply a confirming second touch by applying pressure (e.g., a squeeze, push, or pressing touch) with fingers 302 (e.g., a thumb and forefinger) at the horizontal and vertical locations on touch sensitive bezel 220 corresponding to intercept point 304. This pressure can be detected by pressure/push sensors 224 of touch sensitive bezel 220. Also, in some embodiments where a second touch confirmation is used, a user need not press touch sensitive bezel 220 specifically at the horizontal and vertical locations corresponding to the intercept point; rather, any press to touch sensitive bezel 220 can be sufficient to make a selection.

Touch sensitive bezel 220 relays this confirmation information to sensor data analyzer 212 of bezel sensor tool 210 (FIG. 2). Once sensor data analyzer 212 registers that the user has performed confirming action 306 and determines (as previously described) the intercept point location correlating with confirming action 306, sensor data analyzer 212 relays this location information to selection indicator 216. Selection indicator 216 determines what item/object 308 corresponds with the intercept point location and can communicate a prompt to any program or application residing on smart watch device 200 to execute an action (e.g., opening an application) indicated by the selection.

In some embodiments, feedback control 218 of bezel sensor tool 210 can provide feedback to confirm that an intercept point location has been selected. For example, in one embodiment, feedback control 218 can provide haptic feedback 310 by instructing haptic motor 240 to vibrate when or after a user makes a selection. In other embodiments, feedback control 218 can provide auditory feedback (e.g., a beep) by instructing a speaker system (not shown) of smart watch device 200 to play a sound. In still other embodiments, feedback control 218 can prompt UI control 214 to display visual feedback, such as applying highlighting or animation 312 to selected icon.

Although several of the figures depict smart watch device 200 as having a square or rectangular display 230 and a square or rectangular touch sensitive bezel 220, it should be understood that display 230 and touch sensitive bezel 220 can have any geometric shape. For example, display 230 and touch sensitive bezel 220 can alternatively be oval or round, as shown in FIG. 4B, discussed below. In such an instance, sensor data analyzer 212 determines, based on touch data from a user making contact with touch sensitive bezel 220 at two locations, which of the two locations on touch sensitive bezel 220 correlates with the horizontal x-axis of display 230 and which correlates with the vertical y-axis of display 230. Sensor data analyzer 212 can make this determination by testing two alternative interpretations of the two locations. Sensor data analyzer 212 can first assume that a first touch location represents a vertical coordinate and that a second touch location represents a horizontal coordinate and calculate a location of the resulting intersection. Sensor data analyzer 212 can then assume that the first touch location represents a horizontal coordinate and that the second touch location represents a vertical coordinate and calculate a location of the resulting intersection. In a round or oval display, only one of these intersection locations will be on the face of display 230 and that location is interpreted as intercept point 304.

Figure 4A:
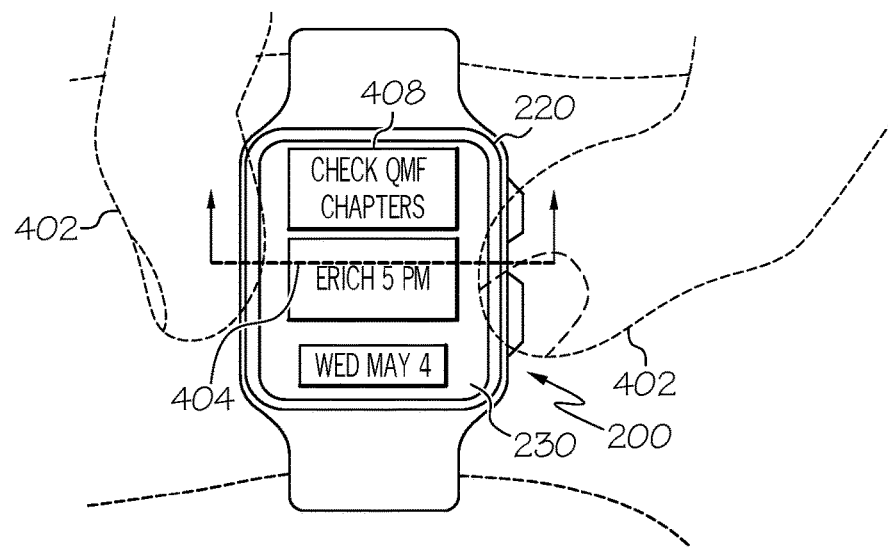
FIG. 4A and FIG. 4B show examples of using a touch sensitive bezel to select an item from a display of a device through one or more selection points on the touch sensitive bezel according to illustrative embodiments.
Figure 4B:
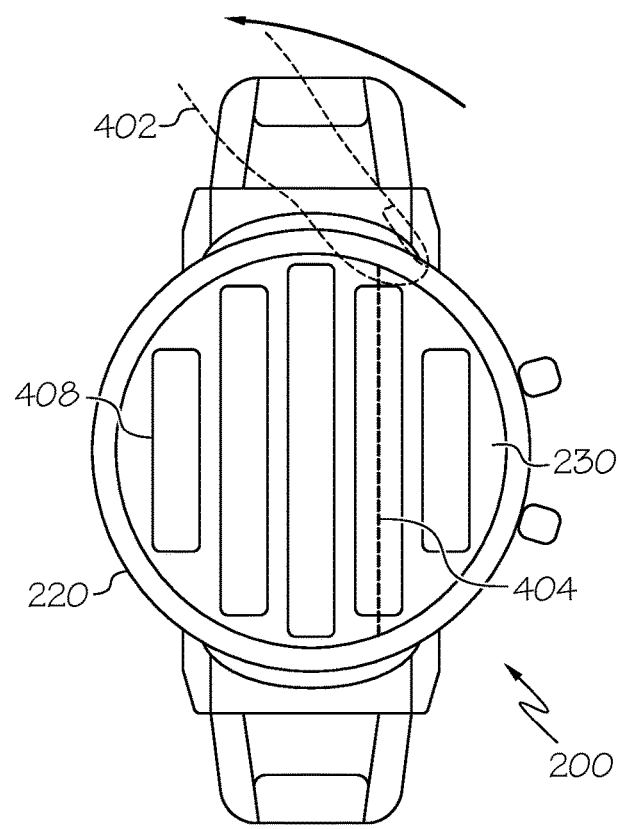

Referring now to FIG. 4A and FIG. 4B, additional examples of using touch sensitive bezel 220 to select an item or object (e.g., an item in a list) from a display 230 of smart watch device 200 through one or more selection points on touch sensitive bezel 220 is shown. In some embodiments, a user may wish to select an item from a unilinear group of items 408 on display 230 that are displayed in a vertical or horizontal only listing (e.g., a list of emails or a photo slideshow). As shown in FIG. 4A, the user may use touch sensitive bezel 220 to scroll or slide a set of items 408 displayed in a vertical or horizontal listing by placing two fingers 402 on opposite sides of touch sensitive bezel 220 and moving, sliding, or dragging fingers 402 in parallel up and down or left and right on touch sensitive bezel 220. Touch sensitive bezel 220 relays this touch data to bezel sensor tool 210 (FIG. 2), where sensor data analyzer 212 can determine from the touch data that the user wishes to scroll or slide the items 408 in display 230. UI control 214 can, in some embodiments, draw vertical or horizontal selection point line 404 on display 230 to permit the user to view the horizontal or vertical position where user's fingers 402 contact touch sensitive bezel 220. In this embodiment, there would be no need to determine or display an intercept point; rather, a selection point corresponds with an item that appears on selection point line 404. As discussed above, the user may perform a confirming action 306 (e.g., a press) to touch sensitive bezel 220 to select an item 408.

In another embodiment, as shown in FIG. 4B, a user may use touch sensitive bezel 220 to scroll or slide a set of items displayed in a vertical or horizontal listing, respectively, by placing one finger 402 on a side of touch sensitive bezel 220 and moving, sliding, or dragging finger 402 horizontally or vertically, respectively, along a degree of freedom of movement on touch sensitive bezel 220. In some embodiments, sensor data analyzer 212 can recognize that display 230 is presenting set of items 408 displayed in a unilinear vertical or horizontal listing and interpret touch data from touch sensitive bezel 220 accordingly. Based on this interpretation, UI control 214 can draw selection point line 404 from a finger contact point on touch sensitive bezel 220 parallel to set of items 408 and perpendicular to a degree of freedom of movement to better allow the user to view a portion of display 230 corresponding with his/her touch.

Figure 5:
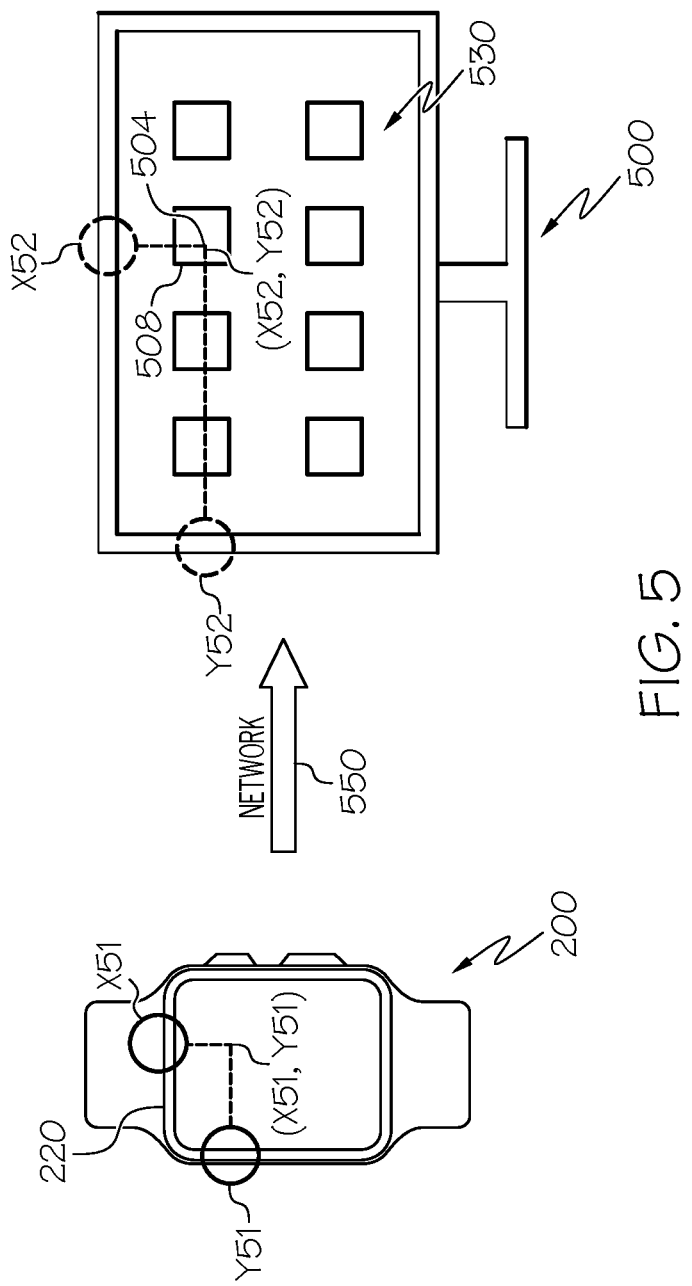
FIG. 5 shows proportional selection of an item on a display of a second device using a touch sensitive bezel of a smart watch device according to illustrative embodiments.

Referring now to FIG. 5, proportional selection of an item on display 530 of second device 500 using touch sensitive bezel 220 of smart watch device 200 is shown. Effectively, touch sensitive bezel 220 can be used as a remote control to select items on other devices. A user may initiate a connection between smart watch device 200 and second device 500 (e.g., a smart TV) through network 550 using a communications component (not shown) of smart watch device 200. Network 550 can be, but is not limited to, a LAN and/or a WAN, a broadband connection, a wireless link (e.g., Bluetooth), or so on. In some embodiments, this connection between smart watch device 200 and second device 500 can be initiated using existing techniques that establish a mobile user device as a remote control of another device.

Once smart watch device 200 is paired with and in communication with second device 500, sensor data from touch sensitive bezel 220 can be used to make selections on second device 500 by mapping a horizontal and vertical position of a user's fingers on touch sensitive bezel 220 to display 530 of second device 500. Sensor data analyzer 212 receives the sensor data from touch sensitive bezel 220 and interprets the data to find horizontal location X51 and vertical location Y51 where the user's fingers contact touch sensitive bezel 220. Sensor data analyzer 212 then can convert these locations to a fraction, percentage, or ratio of a distance across (X %) or a distance up/down (Y %) touch sensitive bezel 220 relative to a width or height, respectively, of touch sensitive bezel 220. For example, if the user touches the top of touch sensitive bezel 220 at two-thirds of the way across and three-quarters of the way up, then the horizontal coordinate of the user's touch is X %=66% over and the vertical coordinate of the user's touch is Y %=75% up (or Y %=25% down).

Smart watch device 200 can transmit these proportional coordinates to second device 500. Second device 500 can then map the proportional coordinates to display screen 530 (e.g., a larger smart TV screen) of second device 500 by calculating horizontal coordinate location X52 as X % of a width of display screen 530 (or a window open in display screen 530) and vertical coordinate location Y52 as Y % of a height of display screen 530 (or a window open in display screen 530). Second device 500 can then find intercept point 504 at proportionally calculated coordinates (X52, Y52). Using proportional coordinates to map the finger positions on touch sensitive bezel 220 to display 530 of second device 500 permits user movement along touch sensitive bezel 220 to be proportionally represented even if the dimensions and/or shape of the smart watch device 200 (e.g., a square) do not map to the dimensions of the TV (e.g., a rectangle).

In some embodiments, intercept point 504 at proportionally calculated coordinates (X52, Y52) can be rendered on display 530 of second device 500, such as by vertical and horizontal intersection lines or by highlighting an item in display 530 located at intercept point 504. As described above with reference to FIG. 3, the user may move his/her fingers along touch sensitive bezel 220 to move intercept point 504 around display 530 and align intercept point 504 with an intended selection (e.g., an application icon on a smart TV) on display 530. A user may perform an additional action (e.g., applying pressure to touch sensitive bezel 220) to confirm that a placement of intercept point 504 is correct and aligned with an item/object 508 that the user wants to select. Touch sensitive bezel 220 relays this confirmation information to sensor data analyzer 212 of bezel sensor tool 210 which interprets the confirmation action as a selection and relays this information to second device 500. Second device 500 determines what item/object 508 corresponds with the selected location and executes an action (e.g., opening an application) indicated by the selection.

Figure 6:
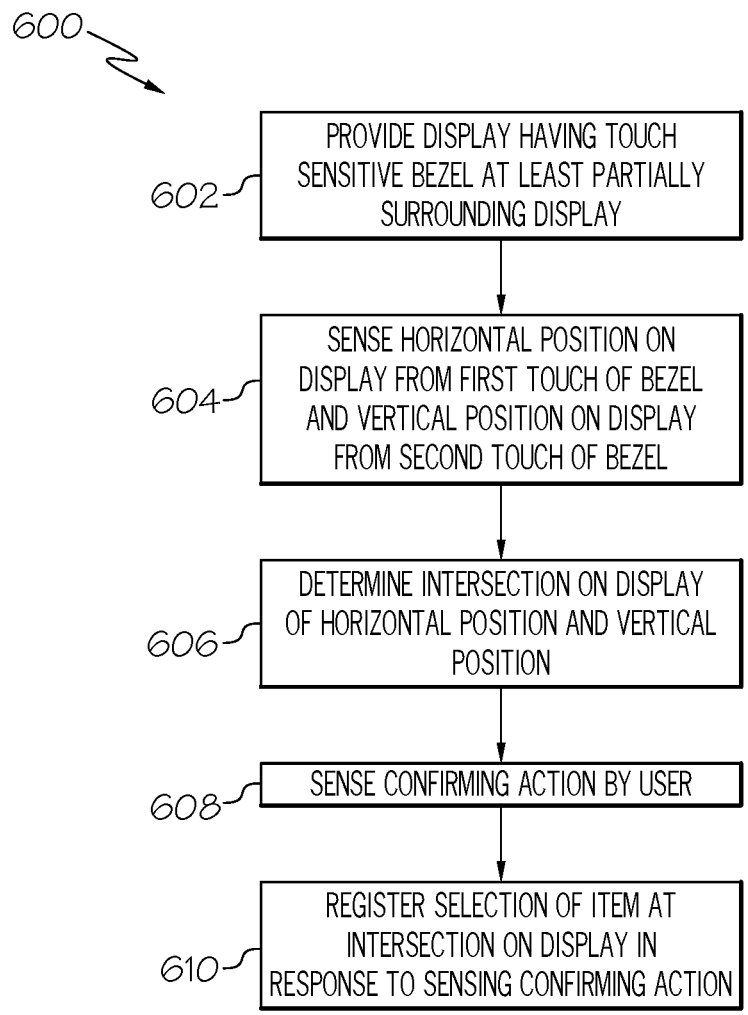
FIG. 6 shows a process flowchart for user interface selection through intercept points defined by a touch sensitive bezel according to illustrative embodiments.

As depicted in FIG. 6, in one embodiment, a system (e.g., computer system 12) carries out the methodologies disclosed herein. Shown is a process flowchart 600 for user interface selection through an intercept point 304 defined by touch sensitive bezel 220. At step 602, smart watch device 200 provides display 230 having touch sensitive bezel 220 at least partially surrounding display 230. At step 604, sensor data analyzer 212 of smart watch device 200 senses horizontal position X1 on display 230 from a first touch of touch sensitive bezel 220 and a vertical position Y1 on display 230 from a second touch of touch sensitive bezel 220. As step 606, sensor data analyzer 212 determines intersection 304 on display 230 of horizontal position X1 and vertical position Y1. At step 608, sensor data analyzer 212 senses confirming action 306 by a user. At step 610, selection indicator 216 of smart watch device 200 registers a selection of item 308 at intersection 304 on display 230 in response to sensing confirming action 306.

Process flowchart 600 of FIG. 6 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for user interface selection through intercept points defined by a touch sensitive bezel. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for user interface selection through intercept points defined by a touch sensitive bezel. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to make a selection in a user interface through intercept points defined by a touch sensitive bezel. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer system for user interface (UI) selection through an intercept point defined by a touch sensitive bezel, the computer system comprising:
   a display;
   a touch sensitive bezel at least partially surrounding the display, the touch sensitive bezel having a set of sensors that detect a presence and a location of one or more fingers of a user on the touch sensitive bezel;
   a memory medium comprising program instructions;
   a bus coupled to the memory medium; and
   a processor, for executing the program instructions, coupled to a bezel sensor tool via the bus that when executing the program instructions causes the system to:
   sense a horizontal position on the display from a first user finger touch of the bezel and a vertical position on the display from a second user finger touch of the bezel;
   determine an intersection on the display of the horizontal position and the vertical position;
   sense a confirming action by the user; and
   register a selection of an item at the intersection on the display in response to sensing the confirming action.

2. The computer system of claim 1, the instructions further causing the system to mark the intersection on the display with a vertical line showing the horizontal position and a horizontal line showing the vertical position across at least a portion of the display.

3. The computer system of claim 2, the instructions further causing the system to:
   sense a second horizontal position on the display from a third touch of the bezel and a second vertical position on the display from a fourth touch of the bezel;
   determine a second intersection on the display of the second horizontal position and the second vertical position; and
   move the marked intersection on the display to the second intersection.

4. The computer system of claim 1, the instructions further causing the system to generate feedback in response to sensing the confirming action by the user, the feedback being selected from the group consisting of: a haptic feedback, an auditory feedback, and a visual feedback.

5. The computer system of claim 1, the instructions further causing the system to:
   connect, through a network, to a device having a display;
   convert the horizontal position to a horizontal ratio relative to a horizontal side of the touch sensitive bezel and the vertical position to a vertical ratio relative to a vertical side of the touch sensitive bezel; and
   transmit the horizontal ratio and the vertical ratio to the device, wherein the horizontal ratio and the vertical ratio are used to map the intersection of the horizontal position and the vertical position onto the display of the device.

6. The computer system of claim 1, the instructions further causing the system to control a user interaction with unilinear content on the display using only one of the horizontal position and the vertical position.

7. The computer system of claim 1, wherein the touch sensitive bezel comprises a set of touch sensors and a set of press sensors and wherein the computer system is a smart watch.

8. A computer program product for user interface (UI) selection through an intercept point defined by a touch sensitive bezel, the computer program product comprising a computer readable storage device, and program instructions stored on the computer readable storage device, to:
   sense a horizontal position on a display, the display having a touch sensitive bezel at least partially surrounding the display, from a first user finger touch of the bezel and a vertical position on the display from a second user finger touch of the bezel, wherein the touch sensitive bezel senses the first user finger touch and the second user finger touch essentially concurrently;
   determine an intersection on the display of the horizontal position and the vertical position;
   sense a confirming action by the user; and
   register a selection of an item at the intersection on the display in response to sensing the confirming action.

9. The computer program product of claim 8, the computer readable storage device further comprising instructions to mark the intersection on the display with a vertical line showing the horizontal position and a horizontal line showing the vertical position across at least a portion of the display.

10. The computer program product of claim 9, the computer readable storage device further comprising instructions to:
sense a second horizontal position on the display from a third touch of the bezel and a second vertical position on the display from a fourth touch of the bezel;
determine a second intersection on the display of the second horizontal position and the second vertical position; and
move the marked intersection on the display to the second intersection.

11. The computer program product of claim 8, the computer readable storage device further comprising instructions to:
connect, through a network, to a device having a display;
convert the horizontal position to a horizontal ratio relative to a horizontal side of the touch sensitive bezel and the vertical position to a vertical ratio relative to a vertical side of the touch sensitive bezel; and
transmit the horizontal ratio and the vertical ratio to the device, wherein the horizontal ratio and the vertical ratio are used to map the intersection of the horizontal position and the vertical position onto the display of the device.

12. The computer program product of claim 8, the computer readable storage device further comprising instructions to control a user interaction with unilinear content on the display using only one of the horizontal position and the vertical position.

13. A computer-implemented method for user interface (UI) selection through an intercept point defined by a touch sensitive bezel, the computer-implemented method comprising:
providing a display having a touch sensitive bezel at least partially surrounding the display, the touch sensitive bezel having a set of sensors that detect a presence and a location of one or more fingers of a user on the touch sensitive bezel;
sensing a horizontal position on the display from a first user finger touch of the bezel and a vertical position on the display from a second user finger touch of the bezel, wherein the touch sensitive bezel senses the first user finger touch and the second user finger touch essentially concurrently;
determining an intersection on the display of the horizontal position and the vertical position;
sensing a confirming action by the user; and
registering a selection of an item at the intersection on the display in response to sensing the confirming action.

14. The computer-implemented method of claim 13, the method further comprising marking the intersection on the display with a vertical line showing the horizontal position and a horizontal line showing the vertical position across at least a portion of the display.

15. The computer-implemented method of claim 14, the method further comprising:
sensing a second horizontal position on the display from a third touch of the bezel and a second vertical position on the display from a fourth touch of the bezel;
determining a second intersection on the display of the second horizontal position and the second vertical position; and
moving the marked intersection on the display to the second intersection.

16. The computer-implemented method of claim 13, the method further comprising generating feedback in response to sensing the confirming action by the user, the feedback being selected from the group consisting of: a haptic feedback, an auditory feedback, and a visual feedback.

17. The computer-implemented method of claim 13, the method further comprising:
connecting, through a network, to a device having a display;
converting the horizontal position to a horizontal ratio relative to a horizontal side of the touch sensitive bezel and the vertical position to a vertical ratio relative to a vertical side of the touch sensitive bezel; and
transmitting the horizontal ratio and the vertical ratio to the device, wherein the horizontal ratio and the vertical ratio are used to map the intersection of the horizontal position and the vertical position onto the display of the device.

18. The computer-implemented method of claim 13, the method further comprising controlling a user interaction with unilinear content on the display using only one of the horizontal position and the vertical position.

19. The computer-implemented method of claim 13, wherein the touch sensitive bezel comprises a set of touch sensors and a set of press sensors.

20. The computer-implemented method of claim 13, wherein the display having a touch sensitive bezel is a smart watch display.

* * * * *